May 19, 1931. J. B. PAUL 1,806,308
CAMERA
Filed Jan. 29, 1929
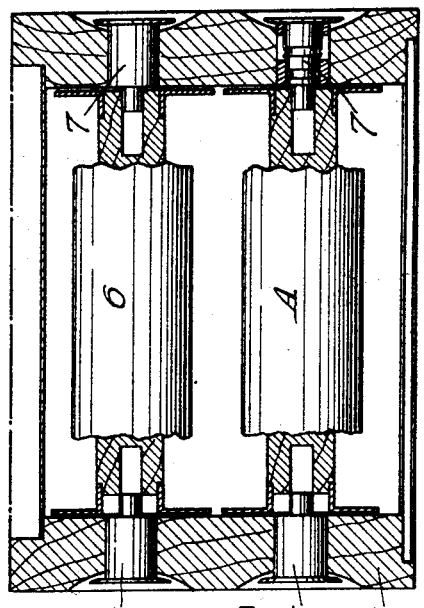
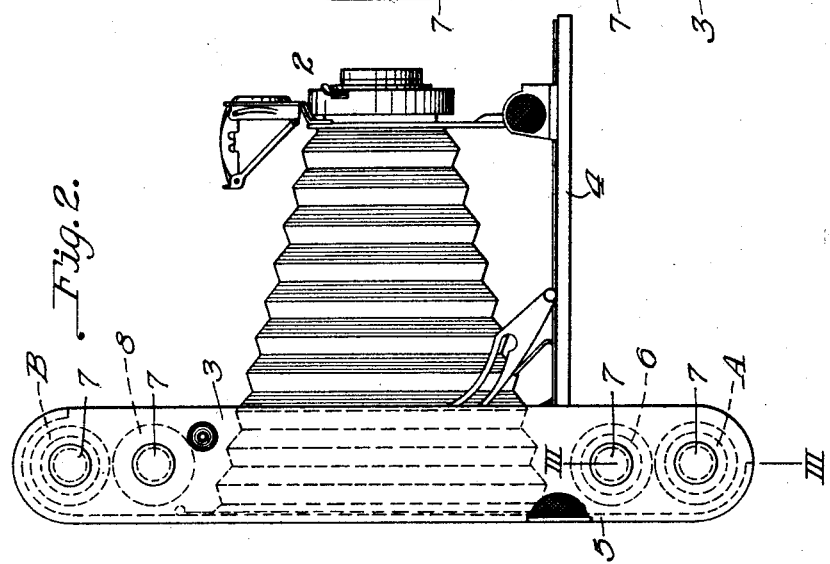
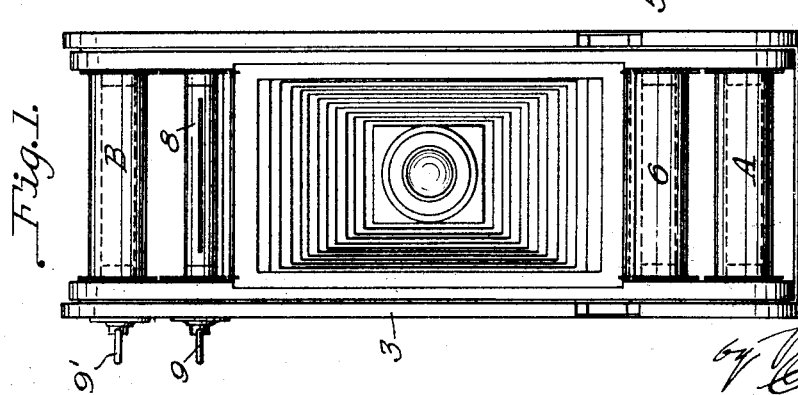
INVENTOR
John B. Paul Patented May 19, 1931

1,806,308

UNITED STATES PATENT OFFICE

JOHN B. PAUL, OF PITTSBURGH, PENNSYLVANIA

CAMERA

Application filed January 29, 1929. Serial No. 335,788.

My invention is an improvement in cameras, of the continuous film type, utilizing rolls of films adapted for successive exposure in a common plane. It has in view to increase the holding capacity of the case by providing additional spool cavities, so arranged and located with reference to the exposure area and the other operative portions of the camera, that a roll of film may be inserted, used, removed, and then replaced for storage, as hereinafter described.

Referring to the drawings showing one preferred embodiment of the invention:

Fig. 1 is a view of my improved camera in rear elevation with the cover removed;

Fig. 2 is a view in side elevation;

Fig. 3 is an enlarged vertical section on the line III—III of Fig. 2.

The drawings illustrate a conventional form of camera in common use, of the continuous film type, in which the lens and exposure terminal portion 2 are collapsed backwardly for enclosure within the middle portion of a case 3, and covered therein by the covering wall 4.

The rear portion of the case 2 is closed by removable cover 5 for insertion and removal of the film spool 6. The latter is rotatably mounted by its ends between pivoting terminals 7, and the film is drawn therefrom across the middle exposure area of the camera by the oppositely located winding spool 8, of well known construction, and provided with the turning terminal 9.

Case 3 extends at both ends beyond the normal distance, usually embodying the receiving spaces for the winding and unwinding spools in their cavities, ordinarily of just sufficient capacity to accommodate a single film and its winding or unwinding spool.

In my invention, the camera case 3 is extended longitudinally beyond such normal length sufficiently far to provide for the mounting of additional spools A and B. The additional spaces may be provided with the retractible pivoting stems 7, as in Fig. 3, or one of the additional stems, as for additional spool B, may be equipped with an additional turning finger extension or key, 9', like that for the usual winding stem 8, for operation in winding. Either with or without such additional winding device however, the slight extension of the casing in the manner shown provides for the mounting of two complete film spools, either fresh and unused, or after exposure and winding on the usual winding stem after exposure.

In constructing the camera for such additional capacity and enlarged use, the ends are rounded as shown, advanced beyond the usual spool locations just sufficient to provide for the additional space necessary for a spool space therebeyond.

In using the device, and assuming the camera to be charged with three unused films, the film may be drawn from spool 6 by winding spool 8 in the usual manner and exposed to completion and removed, after which the used or empty spool 6 may be substituted in place of spool 8 as a winder, for connection with the film of the next spool A.

Empty spool A may then be exchanged with the next new or filled spool B, and its film may then be wound by the additional key 9', or the exposed film from A on the inner position of original spool 8 may be removed and the empty spool of A substituted. Then by transferring the third filled spool B to the A position, its film may be wound and exposed as with the first spools 6 and 8. Spool B after such transfer and winding, after exposure may be allowed to remain in the endmost winding position, if provided with the winding terminal, or in the inner winding position, as preferred.

It will thus be obvious that spool A for instance, may be unwound from its endmost position across the exposure area and re-wound upon a winding stem at position 8 or B. In either case the proper area of the film is brought into registering position with the lens by the usual stop signals visible through the red window opening provided for such purpose, and the camera may thus be used interchangeably throughout the full capacity of its contained films, three in number, either with or without interchange of position.

In either case both the fresh and used films are carried in the camera as a magazine, rendering it thus additionally serviceable and providing convenient and efficient means in avoiding loss of films and at the same time tripling its capacity, with very slight increase in size.

The advantage of the invention will be readily appreciated and understood by all users of this type of camera, and it will be understood that the invention may be utilized in various sizes and in connection with different forms of enclosing casings, within the province of the invention and the scope of the appended claims.

What I claim is:—

1. A camera of the continuous film type having a flat casing enclosing a middle exposure portion and provided at opposite sides of the exposure portion with plural active and inactive spool mounting devices.

2. A camera of the continuous film type having a flat casing enclosing a middle exposure portion and provided at opposite sides of the exposure portion with spool holding cavities each having a primary and a secondary set of independently active and inactive spool pivoting devices.

3. A camera of the continuous film type having a casing enclosing a middle exposure portion and provided at opposite sides of the exposure portion with means for rotatably supporting and rotating a pair of active film spools, said casing being extended beyond each of said means sufficiently far to receive a supplemental relatively inactive spool and having additional means for rotatably supporting and rotating one of such supplemental spools.

In testimony whereof I hereunto affix my signature.

JOHN B. PAUL.